Aug. 29, 1950 N. P. SJOBRING 2,520,571
PRECISION SQUARE
Filed Feb. 25, 1948 2 Sheets-Sheet 1
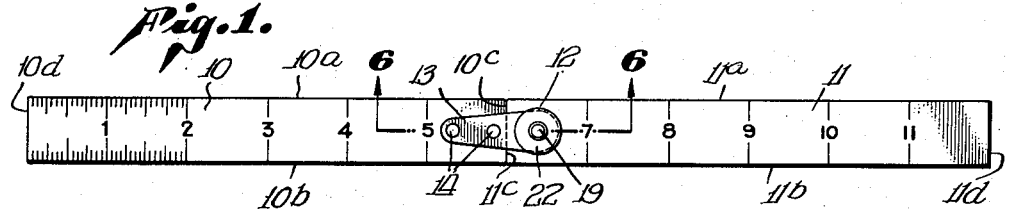
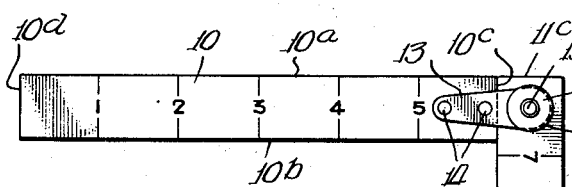
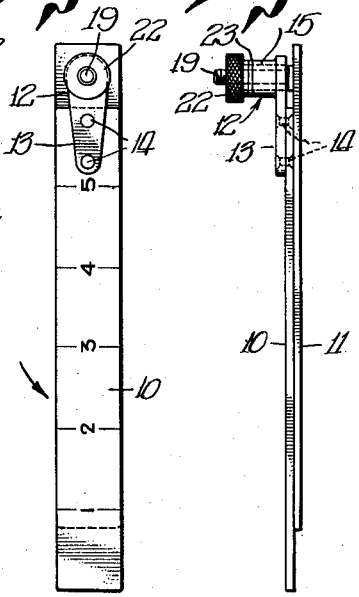
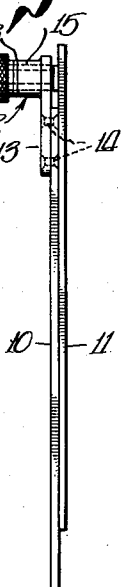
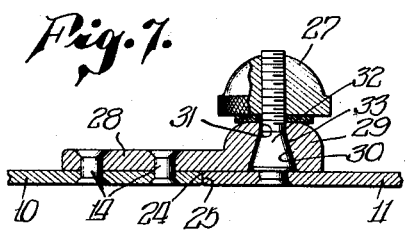
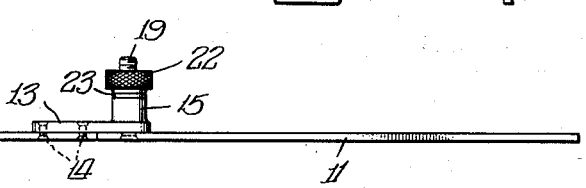
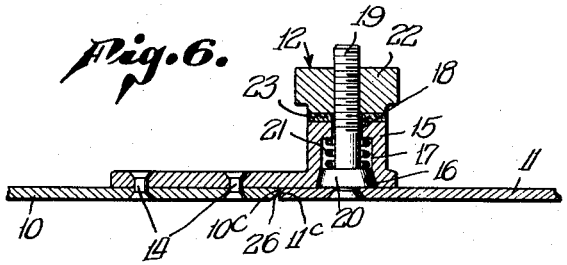
INVENTOR.
Nels P. Sjobring
BY
Wilkinson, Huxley, Byron & Hume
ATTORNEYS Aug. 29, 1950    N. P. SJOBRING    2,520,571
PRECISION SQUARE
Filed Feb. 25, 1948    2 Sheets-Sheet 2
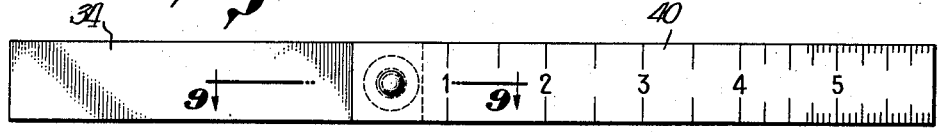
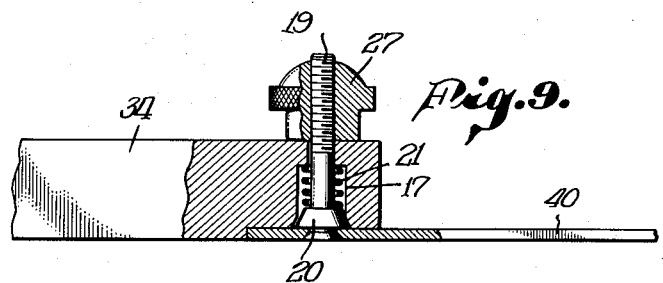
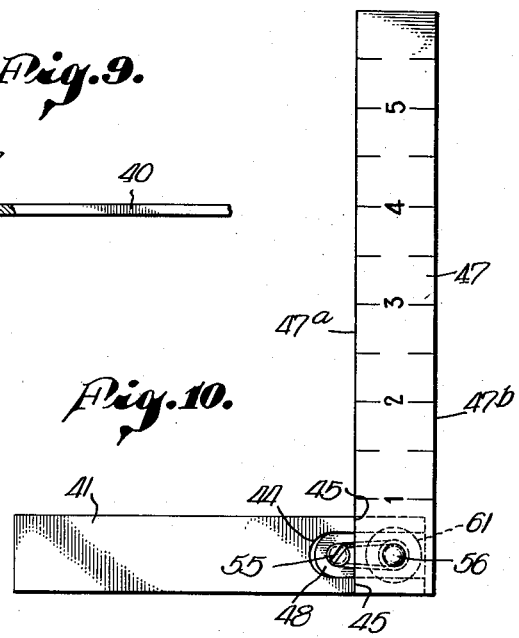
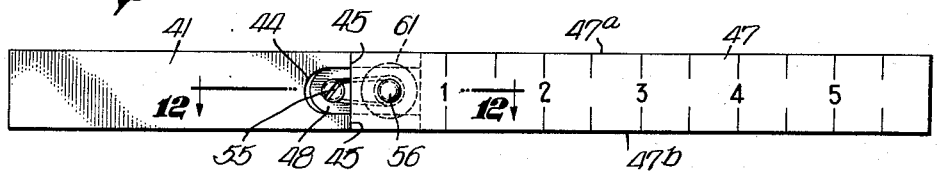
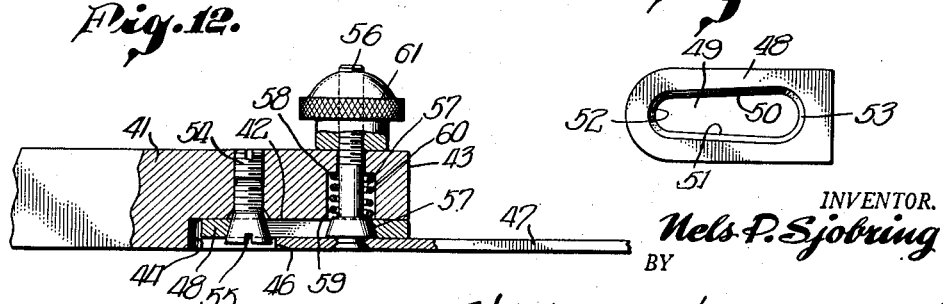
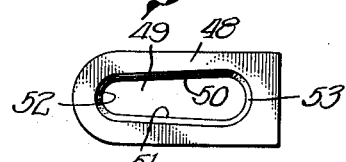
INVENTOR.
Nels P. Sjobring
BY
ATTORNEYS

UNITED STATES PATENT OFFICE 2,520,571

PRECISION SQUARE

Nels P. Sjobring, Los Angeles, Calif.

Application February 25, 1948, Serial No. 10,694

8 Claims. (Cl. 33—115)

The present invention relates to improvements in precision squares.

More particularly, the present invention relates to squares such as those used by tool makers and other artisans, the particular improvement residing in a construction and arrangement whereby the square may be extended to provide a precision rule or may be folded into compact form.

An object of the present invention is to provide an improved square having the features above referred to and having the advantage that any wear which may occur may be readily taken up and compensated for.

A further object is to provide a foldable square which may be used as a rule, in which looseness of parts will be avoided.

A further object is to provide improved means for uniting the two legs of a precision instrument which may be used as a square or a rule whereby said legs will be accurately maintained in their desired positions.

A further object is to provide a precision instrument having legs which may be accurately disposed in right angular relationship with each other or which may be extended in a straight line to provide a rule or which may be folded flatwise against each other for storage purposes; the instrument having the advantage that precision is maintained while the instrument is in use.

A further object is to provide an instrument of the kind just referred to in which any wear which may occur through long and constant use may be readily compensated for.

Further objects will appear as the description proceeds.

Referring to the drawings—

Figure 1 is a top plan view of one embodiment of the present invention, the parts being extended to provide a precision rule;

Figure 2 is a top plan view showing the instrument with the blades in right angular relationship for use as a square;

Figure 3 is a top plan view showing the instrument in a collapsed, non-use position, that is, in a position for storage within a tool box or the like;

Figure 4 is a view in side elevation of the instrument in the position illustrated in Figure 3;

Figure 5 is a view in side elevation of the instrument in the position illustrated in Figure 1;

Figure 6 is a sectional view taken along the plane indicated by the arrows 6—6 in Figure 1;

Figure 7 is a view similar to Figure 6 but showing a modification;

Figure 8 is a bottom plan view of a slightly modified construction, the parts being extended;

Figure 9 is a view on an enlarged scale, partly in section, the sectional portion thereof being taken along the plane indicated by the arrows 9—9 of Figure 8;

Figure 10 shows a further modification, parts thereof being illustrated in their relative positions to provide a square;

Figure 11 is a view similar to Figure 10 but showing the parts in extended positions;

Figure 12 is a fragmentary view partly in section taken along the plane indicated by the arrows 12—12 of Figure 11; and Figure 13 is an enlarged detailed view of a portion of the wear take-up mechanism.

Referring first to Figures 1 to 6, the numerals 10 and 11 indicate two blades, of which the blade 10 may be referred to as the base blade, and the blade 11 may be referred to as the foldable blade. The base blade 10 is provided with the parallel, straight sides edges 10a and 10b and with the parallel, straight end edges 10c and 10d, the edges 10c and 10d being in precise right-angular relationship with the edges 10a and 10b. The blade 11 is provided with the parallel, straight side edges 11a and 11b and with the parallel, straight end edges 11c and 11d, the edges 11c and 11d being in precise right-angular relationship with the edges 11a and 11b. Said blades are graduated in inches or other units of length starting with the edges 10d and 11c and are adapted to be accurately positioned in end-to-end relationship to provide a rule as illustrated in Figure 1. Said blades are also adapted to be disposed in right-angular relationship with each other in the manner illustrated in Figure 2 to provide a square. Said blades are connected to each other through connector mechanism indicated as a whole by the numeral 12. Said connector mechanism 12 provides not only for the arrangements provided for in Figures 1 and 2 but also for a collapsed arrangement of the two blades as illustrated in Figures 3 and 4.

The connector mechanism 12, illustrated in Figures 1 to 6 inclusive, includes the foot portion 13 adapted to be secured to the base blade 10 by means of the rivets 14—14 or other preferred means. The foot portion 13 at one of its extremities is provided with the hub 15 which is centrally apertured, the aperture being defined by the conical seat 16, the approximately cylindrical wall 17 and the opening 18 of less diameter than the cylindrical wall 17. Said aperture is adapted to receive a stud 19 which is riveted or otherwise secured to the foldable blade 11. Said stud 19 is provided with the boss 20 of conical conformation adapted to conform to the conical seat 16. Disposed within the chamber provided by the cylindrical wall 17 is the coil spring 21. The upper extremity of the stud 19 is threaded for the reception of a nut 22. Disposed between the boss 15 and the nut 22 is a washer 23. The side edges 10a and 10b of the blade 10 will be in alignment respectively with the side edges 11a and 11b of the blade 11 when the parts are in extended position as illustrated in Figure 1. Moreover, as mentioned above, the end edge 10c and the end edge 11c of the blades 10 and 11, respectively, will be disposed in precision right-angular relationship with the side edges of the blades 10 and 11 whereby when said blades 10 and 11 are in abutting end-to-end relationship, the necessary alignment between the blades 10 and 11 will be had. Moreover, when the blade 11 is disposed in right-angular relationship with the blade 10, the abutting relationship between the end edge 10c of blade 10 with the side edge 11a or the side edge 11b of the blade 11 will provide an accurate right angular relationship between the blades 10 and 11 as the parts are illustrated in Figure 2. To accomplish this result the axis of swing of the foldable blade is equidistant from the adjacent end edge 11c, the side edges 11a and 11b of the foldable blade 11, and from the adjacent end edge 10c of the base blade. In order to move the blades 10 and 11 relative to each other, it is necessary only to loosen the nut 22 an amount sufficient to allow the blade 11 to be swung clear of the blade 10. Under these conditions the blades may be disposed either in alignment with each other or in right angular relationship with each other after which the nut 19 will again be tightened to provide a rigid relationship between said blades. Moreover, if it is desired to dispose of the blades in flatwise engagement with each other as illustrated in Figures 3 and 4, after the nut 22 has been loosened sufficiently, the two blades may be disposed in the relationship referred to after which the nut 22 will be tightened to hold the blade 11 in frictional engagement with the underside of the blade 10. To facilitate the positioning of the blade 11 with respect to the end edge 10c of the blade 10, said end edge may be slightly beveled as indicated by the numeral 26.

Referring now to Figure 7, a slightly modified construction of connector mechanism is illustrated. Said connector mechanism, which is indicated by numeral 27, includes the foot portion 28 adapted to be secured to the base blade 10 by means of the rivets 14—14 or other preferred means. The foot portion 28 at one of its extremities is provided with the hub 29 which is centrally apertured, the aperture being defined by the conical seat 30 and the approximately cylindrical wall 31. The aperture defined by the cylindrical wall 31 is adapted to receive the stud 32 which is secured to the blade 11 by riveting or other preferred means. Said stud 32 is provided with the conical bearing surface 33 adapted to engage the conical seat 30. According to the construction illustrated in Figure 7, the portion of the stud 32 having the conical bearing surface 33 is longer than the bearing boss 20 of the construction illustrated in Figures 1 to 6. The construction illustrated in Figure 7 obviates the necessity for any coil springs, the co-operating conical portions co-acting to compensate for wear.

Figures 8 and 9 show a connector construction somewhat similar to that illustrated in Figures 1 to 6 but in a square having a base blade of relatively large cross sectional area. The base blade 34 illustrated in Figures 8 and 9 has a dimension parallel with the axis of swing of the foldable blade 40 sufficiently wide that said base blade will, when resting upon a horizontal surface, hold the blade in a vertical position when the instrument is being used as a square. The dimension parallel with the said axis of swing is sufficiently great that no foot portion like the number 13 or 28 is required. In the embodiment of the invention illustrated in Figures 7, 8 and 9, as in the embodiment illustrated in Figures 1 to 6 inclusive, the axis of swing of the foldable blade is equidistant from the adjacent end edge and the side edges of said foldable blade and from an end edge of the base blade.

The instrument illustrated in Figures 8 and 9 can be used either as a square or as a rule or the blades may be folded into side by side relationship in the manner discussed above in connection with Figures 1 to 6 and Figure 7.

Figures 10 and 13 inclusive illustrate a further modification of the mechanism for connecting the two blades. The base blade 41 on one side thereof is provided with a channel indicated by the numeral 42 which channel communicates with the end 43 of said base blade, the other end of said channel being rounded as indicated by the numeral 44. The face of the base blade 41, on the side thereof which is provided with the channel 42, is cut away to provide the aligned shoulders 45—45 disposed transversely of the blade 41. Said shoulders 45—45 are adapted to be abutted by the end 46 of the foldable blade 47 or by either side edge 47a or 47b of said blade 47, and, to accomplish this result, the axis of swing of the blade 47 is equidistant from the edges 46 and the edges 47a and 47b.

The channel 42 is adapted to receive the movable wear plate 48, said wear plate being slidable within said channel 42. Said wear plate 48 is provided with the elongated aperture 49 having the side walls 50 and 51 which taper toward the base of the channel 42. Said walls 50 and 51 converge toward the rounded end 52 of the aperture 49 and diverge toward the rounded end 53 of said aperture 49. The base blade 41 is provided with a threaded aperture for receiving an adjusting screw 54 which adjusting screw has a tapered head adapted to engage the tapering walls 50, 51 and 52. Said screw 54 is provided with the screw pressure slot 55. The foldable blade 47 is provided with the stud 56, riveted or otherwise secured to the foldable blade 47. Said stud is provided with the conical surface 57 adapted to engage the tapering walls 50, 53 and 51 of the wear plate 48. Said stud 56 is adapted to be disposed within an aperture 57 in the end portion of the base blade 41. The upper extremity of the aperture 57 is defined by the annular wall 58 and the upper surface of the conical portion 57 of the stud 56 is defined by the annular wall 59. Disposed between the walls 58 and 59 is the coil spring 60. The plate 48 and the adjacent portion of the base plate 41 provide a housing for the stud 56 and the spring 60. The upper portion of the stud 56 is threaded for the reception of the nut 61.

The distance between the axis of swing of the foldable blade 47 and each edge 47a and 47b is equal to the distance between said axis of swing and the end edge 46 of said blade 47 and equal to the distance between said axis of swing and the shoulders 45—45.

The mode of operation of the construction of Figures 10 to 13 will be clear without detailed explanation. It may be stated, however, that the wear plate 48, together with the dual-holding means embodied in the said screw 54 and stud 56, insures a fixed precision connection between the parts and permits the takeup of any looseness which might otherwise occur after prolonged use.

In all of the embodiments of the invention illustrated and described, manual actuating of the thumb nut permits the loosening of the two blades relative to each other whereby said blades may be swung relative to each other to provide a precision square or a precision rule or to permit the parts to be disposed in side by side relationship for storage. The movable blade is secured in the desired relationship with the base blade by the application of a turning movement upon the adjusting nut.

Though a preferred embodiment of the present invention has been described in detail, many modifications will occur to those skilled in the art. It is intended to cover all such modifications that fall within the scope of the appended claims.

What is claimed is:

1. A foldable precision instrument comprising a base blade, a foldable blade, connector mechanism connecting said blades, said base blade having an end edge portion and also having a housing, said foldable blade having parallel side edges and having a stud projecting from said blade, said stud and said housing having co-operating tapering seats and releasable means for holding said seats in tight engagement with each other, said foldable blade being swingable about the axis of said stud, the axis of said stud being equally distant from each of the two parallel side edges of said foldable blade and from the adjacent end edge of said foldable blade and from an end edge of said base blade.

2. A foldable precision instrument including a base blade, a foldable blade, connector mechanism for swingingly connecting said blades together, said base blade having a housing portion, said foldable blade having a stud projecting therefrom and disposed within said housing portion, said stud and said housing portion having co-operating tapering seats and releasable means for holding said seats in tight engagement with each other, said foldable blade having parallel straight side edges, said base blade having a straight side edge adapted to be aligned with one of the side edges of said foldable blade, said base blade and said foldable blade having end edge portions disposed in right angular relationship with said side edges of their respective blades, the axis of said stud being equally distant from the parallel side edges of said foldable blade and from said end edge portions of said base blade and said foldable blade.

3. A foldable precision instrument including a base blade, a foldable blade, connector mechanism for swingingly connecting said blades together, said base blade having a housing portion, said foldable blade having a stub projecting therefrom and disposed within said housing portion, said stud and said housing portion having cooperating tapering seats and releasable means for holding said seats in tight engagement with each other, said foldable blade having parallel straight side edges, said base blade having a straight side edge adapted to be aligned with one of the side edges of said foldable blade, said base blade and said foldable blade having end edge portions disposed in right angular relationship with said side edges of their respective blades, the axis of said stud being equally distant from the parallel side edges of said foldable blade and from said end edge portions of said base blade and said foldable blade, a spring encircling said stud located within said housing portion and a nut threaded upon said stud for releasably holding said seats in tight engagement with each other.

4. A foldable precision instrument including, in combination, a base blade, a foldable blade and connector mechanism for swingingly connecting said blades together, said connector mechanism including a stud secured to said foldable blade and extending through an end portion of said base blade, said stud having a conical seat, said connector mechanism also including a plate carried within said base blade, said plate being provided with an elongated slot having tapering walls providing a seat, releasable means for urging said seats into tight engagement with each other, a set screw having a head providing a conical bearing surface adapted to engage the tapering walls of said slot at one end of said slot, the conical seat of said stud being adapted to engage the tapering walls of said slot at the other end of said slot.

5. A foldable precision instrument including, in combination, a base blade, a foldable blade and connector mechanism for swingingly connecting said blades together, said connector mechanism including a stud secured to said foldable blade and extending through an end portion of said base blade, said stud having a conical seat, said connector mechanism also including a plate carried within said base blade, said plate being provided with an elongated slot having tapering walls providing a seat, releasable means for urging said seats into tight engagement with each other, a set screw having a head providing a conical bearing surface adapted to engage the tapering walls of said slot at one end of said slot, the conical seat of said stud being adapted to engage the tapering walls of said slot at the other end of said slot, said slot being of progressively varying width from end to end.

6. A foldable precision instrument including, in combination, a base blade, a foldable blade and connector mechanism for swingingly connecting said blades together, said connector mechanism including a stud secured to said foldable blade and extending through an end portion of said base blade, said end portion providing a housing portion, said stud having a conical seat, said base blade having a groove at the portion thereof adjacent to said housing portion and being provided with shoulder means disposed in precise right angular relationship with a side edge of said base plate, a plate disposed within said groove, said plate being provided with an elongated slot having tapering walls providing a seat, releasable means for urging said seats into tight engagement with each other, a set screw having a head provided with a conical bearing surface adapted to engage the tapering walls of said slot at one end of said slot, the conical seat of said stud being adapted to engage the tapering walls of said slot at the other end of said slot.

7. A foldable precision instrument including, in combination, a base blade, a foldable blade and connector mechanism for swingingly connecting said blades together, said connector mechanism including a stud secured to said foldable blade and extending through an end portion of said base blade, said end portion providing a housing portion, said stud having a conical seat, said base blade having a groove at the portion thereof adjacent to said housing portion and being provided with shoulder means disposed in precise right angular relationship with a side edge of said base plate, a plate disposed within said groove, said plate being provided with an elongated slot having tapering walls providing a seat, releasable means for urging said seats into tight engagement with each other, a set screw having a head provided with a conical bearing surface adapted to engage the tapering walls of said slot at one end of said slot, the conical seat of said stud being adapted to engage the tapering walls of said slot at the other end of said slot, said slot being of progressively varying width from end to end.

8. A foldable precision instrument including, in combination, a base blade, a foldable blade and connector mechanism for swingingly connecting said blades together, said connector mechanism including a stud secured to said foldable blade and extending through an end portion of said base blade, said stud having a conical seat, said connector mechanism also including a plate carried within said base blade, said plate being provided with an elongated slot having tapering walls providing a seat, releasable means for urging said seats into tight engagement with each other, a set screw having a head providing a conical bearing surface adapted to engage the tapering walls of said slot at one end of said slot, the conical seat of said stud being adapted to engage the tapering walls of said slot at the other end of said slot, said slot being of progressively varying width from end to end, said foldable blade having parallel side edges and an end edge in right angular relationship with said side edges, the axis of said stud being equally distant from the side edges and end edge of said foldable blade and from said shoulder means of said base blade.

NELS P. SJOBRING.

REFERENCES CITED

The following references are of record in the file of this patent:

UNITED STATES PATENTS

| Number | Name | Date |
| --- | --- | --- |
| 521,597 | Altpeter | June 19, 1894 |
| 750,725 | Stephens | Jan. 26, 1904 |